No. 793,844. PATENTED JULY 4, 1905.
L. LIBBMAN.
MIXER.
APPLICATION FILED DEC. 22, 1904.
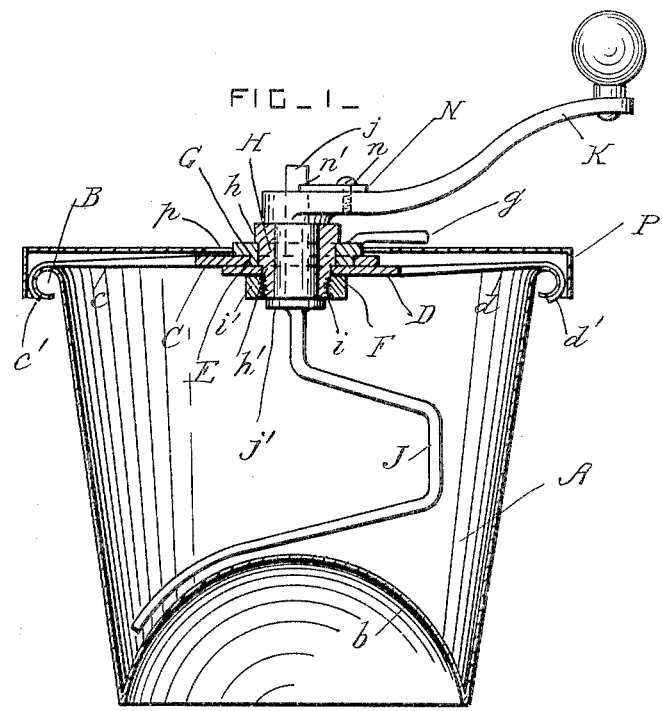
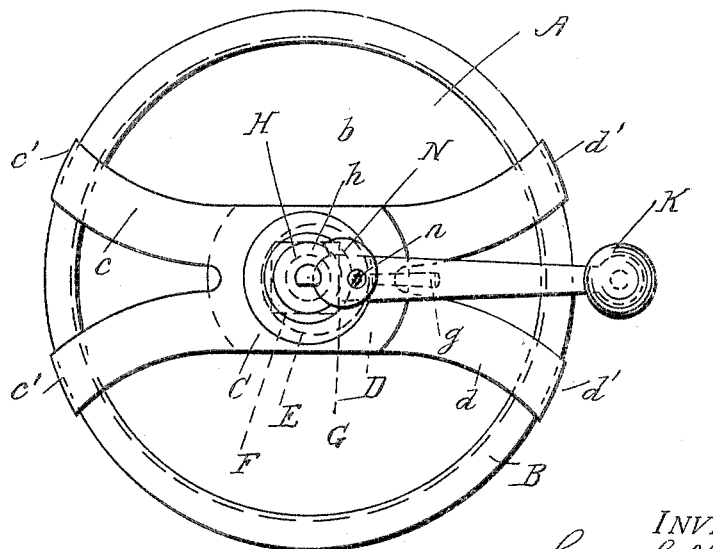
WITNESSES:
Robt. A. Cussel
L. B. Middleton
INVENTOR
Louis Libbman
BY Herbert W. Jenner
Attorney No. 793,844.

Patented July 4, 1905.

UNITED STATES PATENT OFFICE.

LOUIS LIBBMAN, OF EVERETT, MASSACHUSETTS.

MIXER.

SPECIFICATION forming part of Letters Patent No. 793,844, dated July 4, 1905.

Application filed December 22, 1904. Serial No. 237,931.

*To all whom it may concern:*

Be it known that I, LOUIS LIBBMAN, a citizen of the United States, residing at Everett, in the county of Middlesex and State of Massachusetts, have invented certain new and useful Improvements in Mixers; and I do hereby declare the following to be a full, clear, and exact description of the invention, such as will enable others skilled in the art to which it appertains to make and use the same.

This invention relates to apparatus for mixing dough and other similar substances; and it consists in the novel construction and combination of the parts hereinafter fully described and claimed.

In the drawings, Figure 1 is a vertical section through the mixer. Fig. 2 is a plan view of the mixer with the cover removed.

A is a mixing vessel, such as a pail, provided with a convex bottom $b$, which projects upwardly inside the vessel, so that the contents of the vessel may gravitate toward its sides when being mixed or stirred.

C and D are two arms having forked end portions $c$ and $d$, provided with hooks $c'$ and $d'$, which engage with the rim B of the pail. The upper arm C is provided with a circular hole E, and the lower arm D is provided with a rectangular hole F.

G is an eccentric which is journaled in the circular hole E and provided with a handle $g$ for operating it. H is a tubular bearing upon which the said eccentric is mounted. This bearing has a flange $h$ above the eccentric, a rectangular portion $h'$, which engages with the rectangular hole F of the lower arm, and a screw-threaded portion $i$. A nut $i''$ is screwed on the screw-threaded portion $i$ and holds all the said parts securely connected together. The hooked ends of the arms are placed in engagement with the rim of the pail and are turned to the position shown in the drawings. The eccentric is then partially revolved, so as to draw the hooks tightly against the rim of the pail, and thereby clamp the arms securely in position.

J is a cranked stirring-arm provided with a shaft $j$, which is journaled in the bearing H and provided with a collar $j'$, which bears against the under side of the said bearing.

K is a cranked operating-handle which is secured upon the upper end portion of the shaft $j$, so as to form a means for revolving it. The shaft $j$ is preferably provided with a flat portion, so that the handle cannot slip.

N is a cam which is mounted on a pin $n$, which projects upwardly from the handle and which is turned into engagement with a notch $n'$ in the upper part of the shaft after the handle has been placed in position.

This mixer can be taken apart with great facility. When the cam is turned out of engagement with the notch in the shaft, the handle can be lifted off, and when the eccentric is turned back the arms can be moved circumferentially toward each other and then lifted away from the pail, or, if desired, the arms, together with the shaft and handle, can all be removed at once.

P is a lid or cover provided with a hole $p$ at its center part. This lid is slipped over the top of the pail during the mixing operation to prevent dirt from getting into the pail.

What I claim is—

1. In a mixer, the combination, with a vessel, of two arms provided with hooks for engaging with the rim of the vessel, an eccentric journaled in a hole in one of the said arms, a bearing secured in a hole in the other said arm and projecting through the said eccentric, and a revoluble mixing-arm journaled in the said bearing and extending downwardly inside the said vessel.

2. In a mixer, the combination, with a vessel, of two arms provided with hooks for engaging with the rim of the vessel, the upper of the two arms having a round hole and the lower arm a rectangular hole, an eccentric journaled in the said round hole, a bearing arranged in the said eccentric and provided with a rectangular portion which engages with the said rectangular hole, a nut screwed on the lower part of the said bearing and holding the said parts connected, and a revoluble mixing-arm journaled in the said bearing.

In testimony whereof I have affixed my signature in the presence of two witnesses.

LOUIS LIBBMAN.

Witnesses:
ALICE J. MURRAY,
FREDERICK K. DAGGETT.